Nov. 25, 1969     I. JACOB ET AL     3,480,709
PROCESS FOR THE MANUFACTURE OF FILAMENTS OF SYNTHETIC LINEAR
POLYMERS OF HIGH MOLECULAR WEIGHT CRIMPED DURING SPINNING

United States Patent Office 3,480,709
Patented Nov. 25, 1969

3,480,709
PROCESS FOR THE MANUFACTURE OF FILAMENTS OF SYNTHETIC LINEAR POLYMERS OF HIGH MOLECULAR WEIGHT CRIMPED DURING SPINNING
Ingolf Jacob, Strassberg, near Augsburg, and Ralf Ueberdiek, Goggingen, near Augsburg, Germany, assignors to Farbwerke Hoechst Aktiengesellschaft vormals Meister Lucius & Bruning, Frankfurt am Main, Germany, a corporation of Germany
Filed Dec. 28, 1967, Ser. No. 694,158
Claims priority, application Germany, Jan. 3, 1967, F 51,163
Int. Cl. D01d 5/22; D02g 1/00; B29c 25/00
U.S. Cl. 264—237                            5 Claims

ABSTRACT OF THE DISCLOSURE

Manufacture of filaments of synthetic linear polymers of high molecular weight having a permanent three-dimensional crimp by melt-spinning the filaments, cooling them rapidly on one side below the spinneret on a special cylindrical or flat cooling body, the minimum length of contact between the filaments and the surface of the cooling body depending on the titer of the individual filaments and the draw-off rate, and developing the latent crimp so obtained by drawing the filaments and subsequently heating them without tension.

---

The present invention relates to a process for the manufacture of filaments of synthetic linear polymers of high molecular weight crimped during spinning.

It has already been proposed to make three-dimensionally crimped filaments of polyethylene terephthalate by unsymmetrically quenching the spun filaments with the help of a jet of air which is at room temperature, whereby filaments are obtained which are distinguished by having a different birefringence across the cross-sectional area (cf. U.S. Paatent 3,050,821). By drawing such filaments a three-dimensional crimp which can be increased by heat treatment is obtained.

It has also been proposed to make crimped filaments by passing the filaments, after spinning, over a surface heated at a temperature above the melting point of the filaments, where the filaments are continuously heated on one side, while being under tension and being drawn by at most 10%. In this manner, a latent crimp is obtained which can be developed by heating and simultaneous shrinkage.

There have further been proposed processes in which the spun filaments are unsymmetrically quenched below the spinneret at as small a distance from the latter as possible, using a film of liquid which is so thin that only one side of each filament contacts the film of liquid (cf. British Patent 809,273). The said film is formed on the surface of a perforated hollow body filled with a cold liquid, for example water, which penetrates through the pores and constantly renews the film of liquid. Also these unsymmetrically quenched filaments are distinguished by a latent crimp which becomes apparent when the filaments, after having been drawn, are heated while being simultaneously allowed to shrink.

The present invention provides a process for making filaments of synthetic linear polymers of high molecular weight, particularly linear polyesters, having a permanent three-dimensional crimp by rapidly cooling the spun filaments on one side below the spinneret and developing the latent crimp by drawing and subsequent heating without tension, which comprises carrying out the unilateral cooling on a cooling body having a surface temperature within the range of from 0 to 70° C., advantageously from 10 to 30° C., the surface of the cooling body being dry and the minimum length ($l_{min}$) of contact between the individual filaments and the surface of the cooling body, expressed in cm., being calculated according to the following formula $$l_{min} = 3\sqrt{T} \cdot \frac{V}{1500}$$

in which T is the titer of the individual filament given in denier and V is the draw-off rate given in meters per minute.

In a special form of the process of the invention the cooling effect is enhanced by blowing a stream of air or another inert gas on the filaments through an additional annular nozzle in order to prevent the capillary filaments sticking together. Blowing the filaments with said stream from an additional annular nozzle is advantageously carried out at a minimum distance of 8 cm. below the spinneret between the latter and the cooling body. To obtain a good crimping effect it is important that, besides a sufficiently great length of contact between the filament and the cooling body, the spinning conditions and the raw material used should be chosen such that the orientation of the chain molecules already present in the filament is as pronounced as possible since only then a sufficiently pronounced asymmetry of the filament structure across the cross-sectional area is obtained. The simplest way to obtain the desired high degree of orientation of the filaments is to rapidly draw them off and to use a raw material of high intrinsic viscosity.

The process in accordance with the invention has the advantage that it can be carried out industrially in a simpler, more secure and more variable manner than the known processes. Moreover, the filaments can be wetted with water and brightened in usual manner.

The process of the invention is applicable to filaments of high molecular weight polymers that can be spun from the melt, for example high molecular weight polyesters, polyamides and polyolefins and copolymers of these groups of compounds.

When carrying out the process of the invention, the synthetic polymers of high molecular weight are spun in known manner on the apparatus generally used for melt spinning, for example, extruders or grid spinning machines. The draw-off rate should be higher than 500 m./min., advantageously above 1500 m./min. The filaments which can be crimped in this manner have an individual final titer within the range of 0.5 to 40 deniers. At a distance of 10 to 100 cm., advantageously 20 to 30 cm., from the spinneret the filaments which are still very hot are conducted over the surface of a cooling body having a temperature within the range of from 0 to 70° C., advantageously 10 to 30° C., on which the filaments are quenched unsymmetrically on one side. By this procedure, the orientation of the filament is changed on the cooled side of the filament. A drop in orientation which can be proved by measuring the different values of birefringence on both sides of the filament, is produced in a transverse direction to the longitudinal direction of the filament. The crimp of the filament is at first invisible and is imparted to the filament in a latent form only. Sufficient cooling is evidenced by the fact that the individual capillaries, after leaving the cooling body, can be collected without sticking together. The specific viscosity $\eta$ spec. of the melt should be greater than 0.5, and is advantageously within the range of 0.75 to 1.2 and more.

The minimum length of contact $l_{min}$ between the filaments and the cooling body depends on the titer T of the individual filament and the draw-off rate V. The relationship between these parameters is illustrated by the following formula $$l_{min} = 3\sqrt{T} \cdot \frac{V}{1500}$$

in which $l_{min}$ is given in cm., T in denier and V in meters per minute.

Any desired maximum length of contact may be used. An upper limit of the length of contact is reached when the filaments, on leaving the cooling body, have reached a temperature of 70° C., measured with a Hastings-Raydist-temperature measuring instrument. The times of contact are within the range of 0.001 and 0.1 second.

After spinning has been started, the cooling body is advantageously moved along the filaments towards the spinneret. Since the distance at which the cooling body must be from the spinneret in order to obtain a desired crimp depends on the titer of the individual filaments, the draw-off rate, the spinning temperature, the molecular weight of the filament material and the air jet directed to the filaments, it is advantageous to determine the distance required for an optimum crimp by experiment by moving the cooling body towards the spinneret until the filaments stick to the cooling body. When the distance so determined is enlarged again by 1 to 2 cm., the position is obtained in which the filaments can be unilaterally cooled without sticking to the cooling body, and the filaments are imparted a gradient of orientation sufficient for crimping. When the distance of the cooling body to the spinneret is further enlarged, the gradient of orientation across the cross-sectional area is reduced and the obtainable crimp consequently also decreases.

In a limiting case of the process of the invention, the cooling body is at such a distance from the spinneret when it is first touched by the filaments that the filament temperature is 100° C., as determined with a Hastings-Raydist-temperature measuring instrument, before the filaments contact the cooling surface. In this case, asymmetry of cooling is so small that a crimp can no longer be obtained. In such a case, the cooling surface may be used for rapidly cooling the bundle of filaments. In this manner the length of the spinning chamber can be considerably reduced, without the filaments sticking together when they are collected by the first thread guide. In this form of the process of the invention, smooth, uncrimped, very uniform filaments are obtained. The process in accordance with the invention has the advantage over the known processes that it enables the length of the spinning chamber to be reduced to 1 to 2 m. This reduction is even greater in the manufacture of crimped filaments since in this case the distance between spinneret and cooling body is further reduced. The required length of the spinning chamber is thus reduced to 0.3 to 1.0 m.

When filaments with a latent crimp obtained by the process of the invention are drawn at room temperature, a helical three-dimensional crimp in wide bends is already obtained, which crimp can be increased and set by a heat treatment. Certain plasticizing chemicals which reduce the second order transition temperature to values below room temperature are also suitable for developing the crimp. In the case of polyethylene terephthalate, for example, methylene chloride may be used.

When carrying out the process in accordance with the invention on an industrial scale, the spun filaments are plied to form a relatively thick tow which is drawn at temperatures within the range of from room temperature to 180° C., advantageously from room temperature to 80° C. Drawing is carried out in air, liquids or vapors or on a heated surface. The filaments first show a crimp in wide bends which can be improved and set by a subsequent heat treatment at a temperature within the range of from 70 to 230° C., advantageously from 90 to 160° C. For the transmission of heat there may be used air, liquids, vapors or heated surfaces.

For processing the filaments crimped in accordance with the invention, they may be cut into staple fibers or may be used as a converter cable. An additional crimping in a stuffing chamber is also possible. If it is advantageous for special fields of application, the filaments may first be cut and then the crimp may be developed either on the fibers or on the finished yarn, woven or knitted fabric or fleece. The process in accordance with the invention can be used not only for making fibers but also for the manufacture of textured filaments. Continuous filaments which have been crimped during spinning by the process of the invention can be processed in a manner similar to that used for filaments which have been subjected to a false-twist treatment. Also in this case, the crimp may be developed wholly or partially at a later stage of the processing process.

The fibers obtained by the process of the invention are valuable textile fibers because they have the excellent properties of synthetics and are also distinguished by a particularly good crimp of high retentivity. The crimp in accordance with the invention is three-dimensional and helical. It imparts to the fiber a great bulkiness and a high resilience. The woven or knitted fabrics made of such material are light, bulky textiles having an excellent handle and agreeable properties of wear.

As cooling body it is advantageous to use in the process of the invention a hollow body which can be cooled and the surface of which may be straight or slightly curved in the direction in which the filaments move. The shape of the cooling body depends on the spinneret used. For annular nozzles it is advantageous to use cylindrical bodies (cf. FIG. 1 of the drawings) while flat cooling bodies (cf. FIGS. 2a/b/c/d/e) are used for spinnerets in which the orifices are arranged in a row.

An apparatus suitable for use in carrying out the process of the invention is illustrated diagrammatically by way of example in the accompanying drawings of which.

Figures 1, 2A:
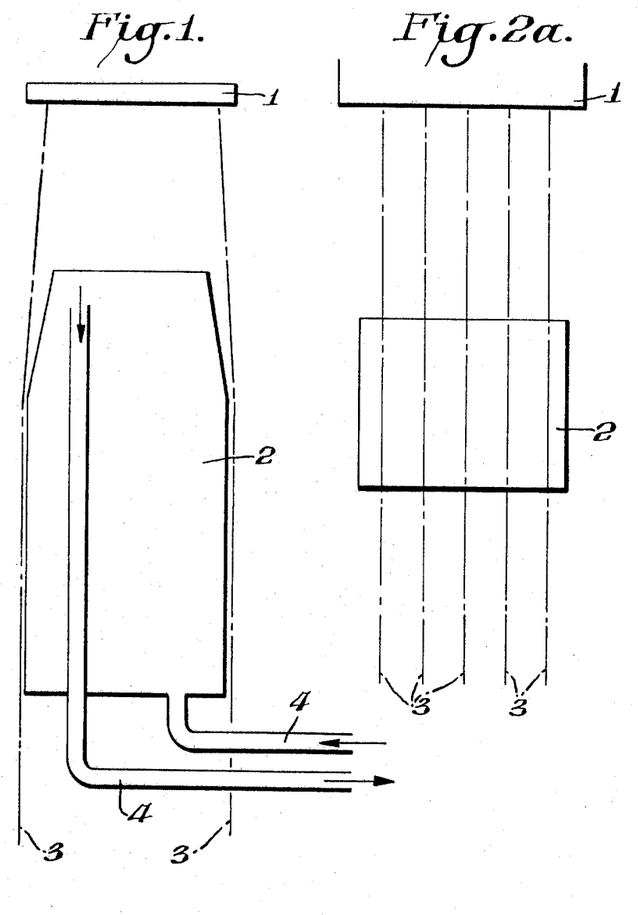
FIG. 1 is a view of a cylindrical cooling body.
FIG. 2a is a front view of a flat cooling body.

In FIGS. 1 and 2a to 2e a spinneret is represented at 1. In FIG. 1 it is an annular spinneret and in FIGS. 2a to 2e it is a spinneret in which the orifices are arranged in a row. A cooling body is denoted by 2; it is cylindrical in FIG. 1 and flat in FIGS. 2a to 2e. Filaments are represented at 3 and the pipes for the cooling water of the cooling body are denoted by 4 in FIGS. 1, 2d and 2e.

Figure 2B:
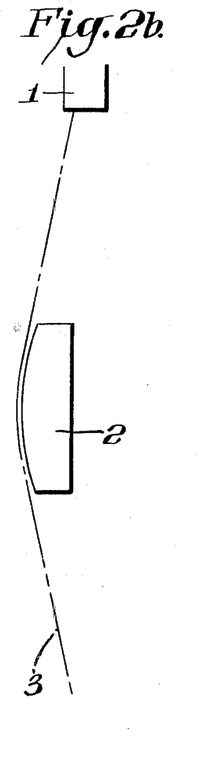
FIG. 2b is a side view of a flat cooling body having a curved surface.
Figure 2C:
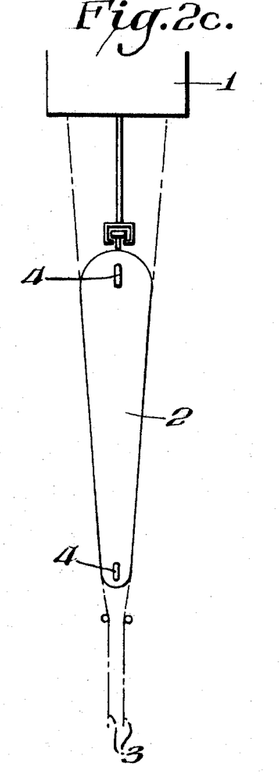
FIG. 2c is a side view of a flat cooling body which narrows towards the lower end.
Figure 2D:
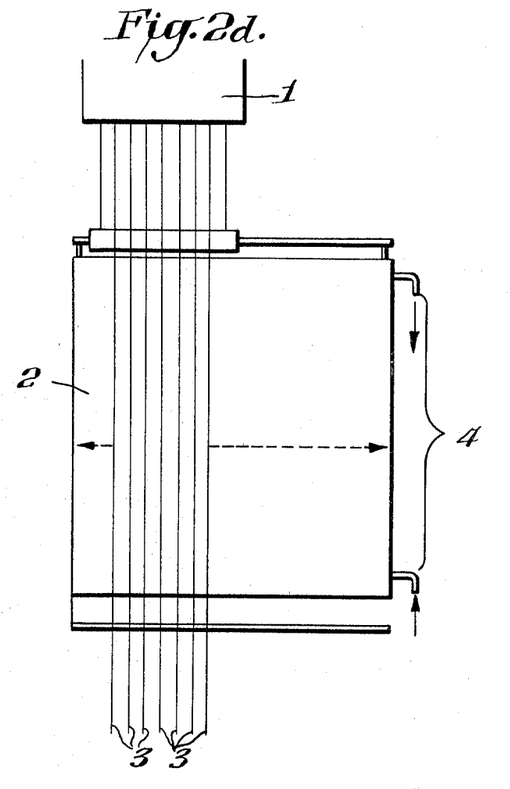
FIGURE 2d and 2e are front views of the same flat cooling body shown in two different positions to the spinneret.
Figure 2E:
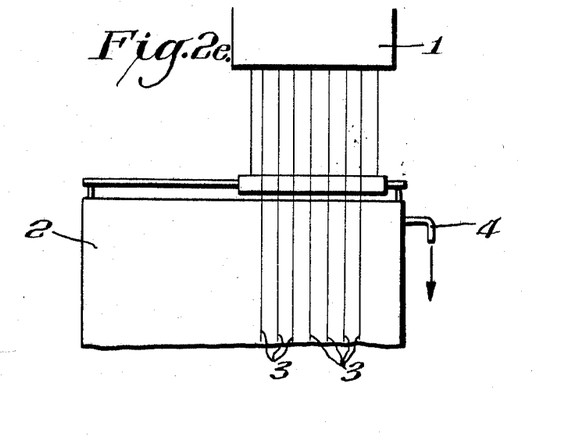

The flat cooling body shown in FIGS. 2c to 2e is advantageously supported by a mechanical supporting system (not shown; comprising, for example, a metal plate which is secured to the spinneret in a vertical position, is parallel to the row of orifices of the spinneret and is provided at its lower end with a rail from which the cooling body is shiftably suspended) in a manner such that it can be shifted parallel to the row of spinneret holes. This mode of construction of the cooling apparatus of the invention enables, of example, the surface of the cooling body to be cleaned without interrupting the spinning process. The position of the cooling body shown in FIG. 2e, for example, has been shifted with respect to the position shown in FIG. 2d so that the part of the cooling body surface over which the filaments had been passed in FIG. 2d can now be cleaned or subjected to another change, without interfering with the spinning process.

Figure 3:
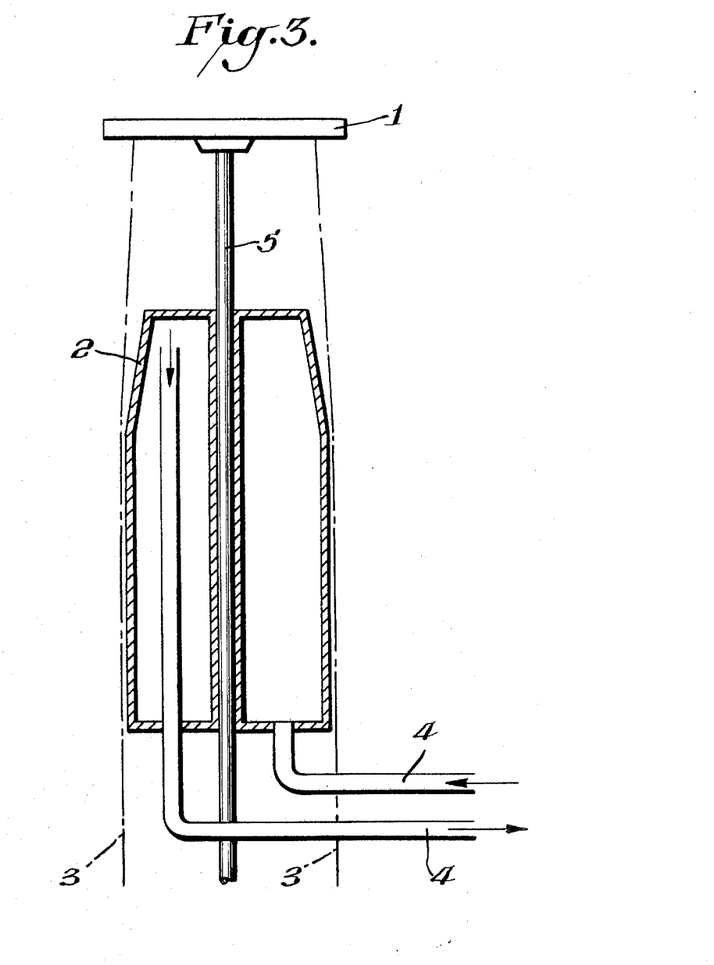
FIG. 3 is a cross-section through a cylindrical cooling body with a rod serving as a support.
Figure 4:
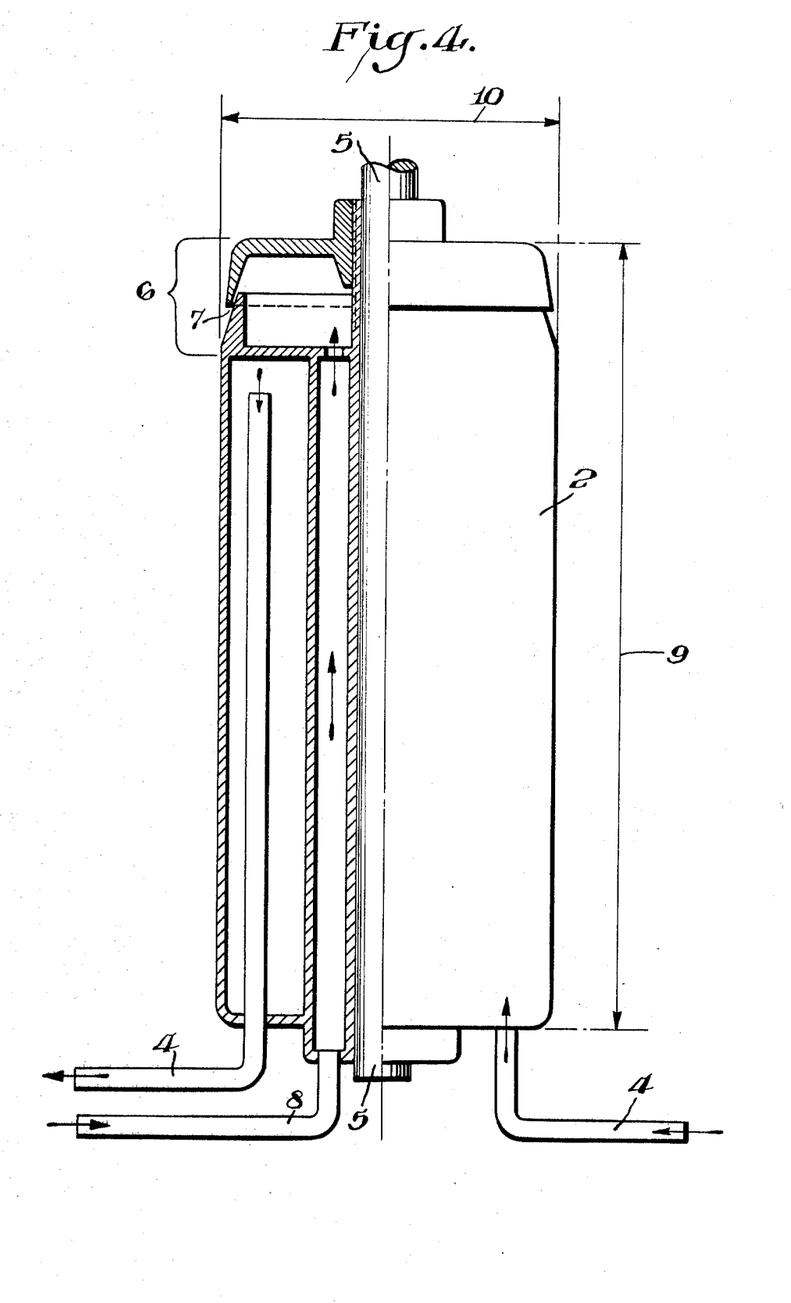
FIG. 4 is a view, partly in section, of a cylindrical cooling body provided with a blowing device.

The filaments should slide over the cooling body with as little friction as possible. The diameter of the cylindrical cooling body 2 in FIG. 1, for example, is only little larger than the diameter of the ring of nozzle orifices. To reduce friction, the filaments should be deflected only little from their initial path by the cooling body so that the forces pressing them against the cooling surface are kept small. As shown in FIG. 1, the cooling body 2 narrows towards the top in the direction of the spinneret 1 so that the filaments strike the cooling body at a very small angle. Nor should filaments emerging from nozzles in which the orifices are arranged in a row be deflected too much from their direction of movement when striking flat cooling bodies. Friction is further reduced by providing the cooling body 2 with a mat chromium surface. As shown in FIG. 3, the cooling body 2 is supported by a rod 5 which can be secured to the spinneret 1 after spinning has set in and on which the cooling body is centered and supported. In FIG. 4, the end of the cooling body 2 which faces the spinneret is mounted with an annular blowing device 6 provided with a cap which can be screwed on in order to prevent the filaments sticking together. The nozzle 7 through which the air jet issues is arranged such that the latter moves almost in the direction of the filaments. The width of the slit through which the air jet issues may be within the range of from 0.05 to 5 mm., advantageously from 0.3 to 0.6 mm. The nozzle for the air jet may also be shaped such that the jet strikes the filaments at right angles. The angle which the channel of the nozzle and consequently the air jet leaving the annular nozzle form with the vertical many generally be within the range of from 2 to 90°, advantageously from 8 to 20°. The air is fed to the blowing device 6 through the pipe 8. The blowing air is generally at room temperature, but may also have a lower or higher temperature (up to 70° C.). The speed of the air jet may be up to 200 m./min.; advantageously it amounts, however, only to at most 30 m./min. Instead of air, another inert gas which does not attack or damage the filaments may be used. Reference numerals 2, 4 and 5 in FIG. 4 have the same meanings as in FIGS. 1 to 3. The length 9 of the cooling body is 29.5 cm., the diameter 10 is 11 cm.

Figure 5:
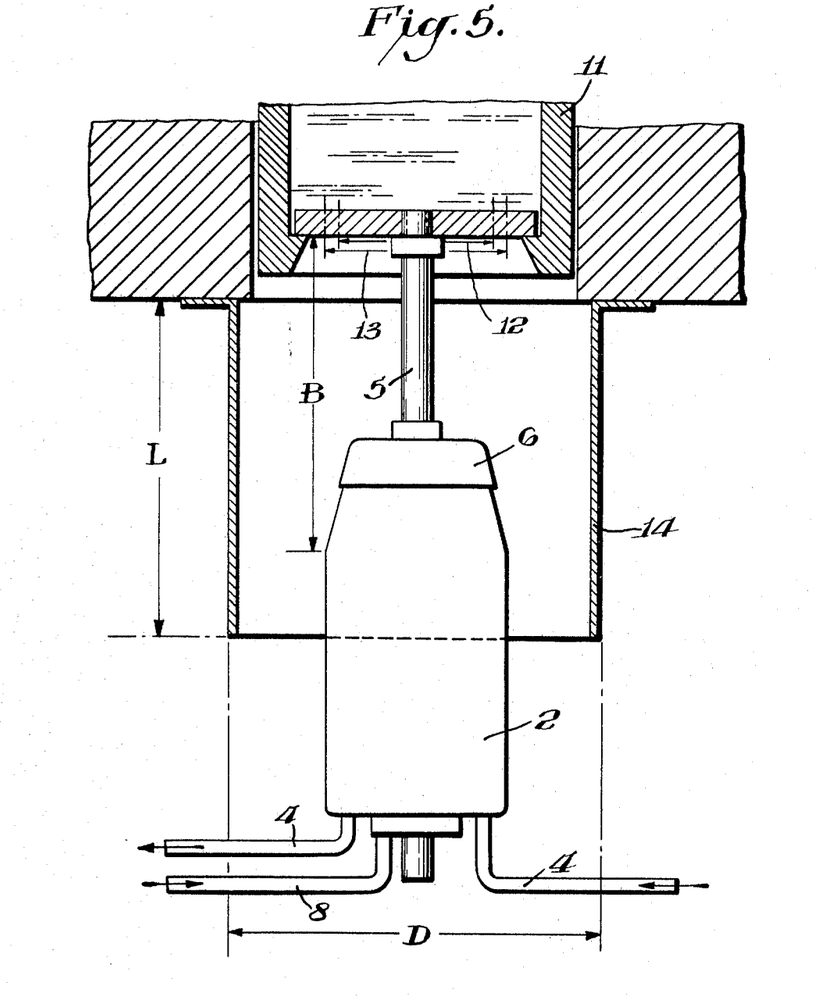
FIG. 5 is a view, partly in section, of a cylindrical cooling body combined with an annular nozzle, and a protective tube.
Figure 6:
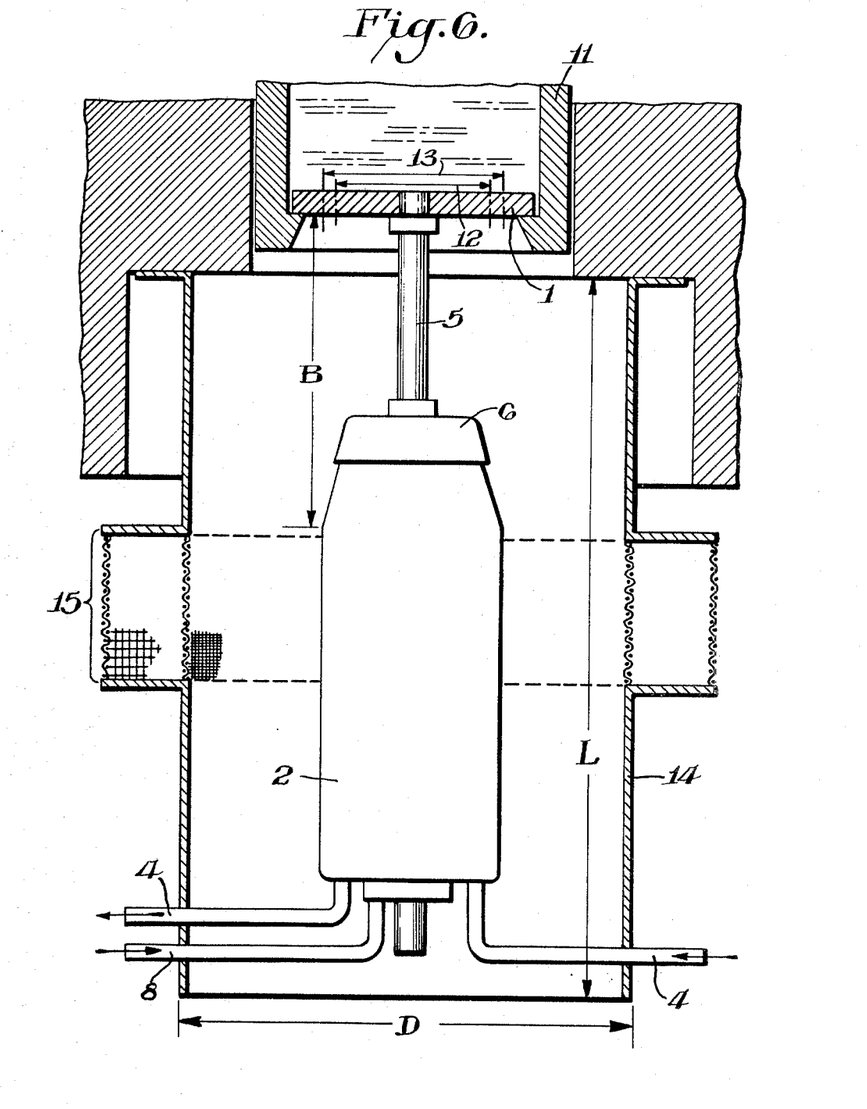
FIG. 6 is a view, partly in section, of a cylindrical cooling body combined with an annular nozzle and another form of the protective tube.

FIGS. 5 and 6 show a cooling body 2 provided with an annular blowing device 6 in connection with a spinning device. The spinneret 1 of the spinning head 11 is an annular nozzle with two rings of holes of different diameters 12 and 13. The cooling body 2 is partially (FIG. 5) or completely (FIG. 6) surrounded by a protective tube 14 of a material which may be impermeable to air, for example sheet metal, or which may be permeable to air, for example a metal texture. In FIG. 6, the protective tube 14 is provided with an annular interruption zone 15.

The interruption zone 15 consists of a double metal screen, the inner screen having a smaller mesh width, for example 68 meshes per cm.², than the outer screen, for example 200 meshes per cm.². Reference numerals 4, 5 and 8 have the same meanings as in the preceding figures. Letters B, D and L designate lengths which are referred to in Examples 3 and 4.

The following examples illustrate the invention, but are not intended to limit it thereto.

The specific viscosity values indicated in the examples were obtained at 25° C. on solutions of 1% by weight strength of the polymers in phenol/tetrachlorethane (60/40) as a solvent.

The K-values indicate the elongation of the crimped individual fibers in percent. These K-values are calculated from the difference in length between an extended crimped fiber and a crimped fiber loaded with a weight corresponding to an extended crimped fiber of the same kind having a length of 18 m.

The $K_1$ values are the values which were determined on the crimped fibers as they had been obtained in the examples while the $K_2$ values were measured on crimped fibers which had been charged for one minute with a weight corresponding to an extended crimped fiber of the same kind having a length of 5000 m. The retentivity values $Re$ were calculated from the quotients from $K_2$ and $K_1$:

$$Re = \frac{K_2}{K_1} \cdot 100\%$$

EXAMPLE 1

(a) Polyethylene terephthalate of a specific viscosity of 0.896 was spun at a rate of 195 g/min. from a 120-aperture nozzle (bore hole length 0.5 mm, bore hole diameter 0.5 mm), the apertures of which were disposed on two concentric circles having diameters of 100 and 110 mm, respectively. The cooling body (see FIG. 4, length 29.5 cm, diameter 11 cm, no blowing with air) which was at a temperature of 25° C. was mounted on a guide rod secured to the middle of the spinneret. The distance of the cooling body from the spinneret was such that the length of the filaments between the spinneret and the place of contact with the cooling body was 24 cm. The distance between the middle of the spinneret and the wall of the spinning chamber was 16 cm. Below the cooling body, the filaments had cooled down to such an extent that they could be collected by a thread guide. The filaments were wound up on a bobbin at a draw-off rate of 1400 m./min. By drawing the filaments at room temperature or in steam of about 100° C. at a draw ratio within the the range of 1:3 to 1:3.5 and allowing them to shrink without tension for some seconds at 160° C., a stable three-dimensional helical crimp in fine bends was obtained. The crimped filaments could be cut into staple fibers in known manner. The crimping data depended on the drawing conditions:

Drawing at room temperature (in air)

$K_1 = 21\%$, $K_2 = 15\%$, $Re = 71\%$, 5.2 bends/cm.
Elongation 73%.
Tenacity 3.5 g/den.

Drawing in steam of about 100° C.

$K_1 = 12\%$, $K_2 = 8.5\%$, $Re = 71\%$, 3 bends/cm.
Elongation 53%.
Tenacity 3.5 g/den.

(b) When the distance between the surface of the spinneret and the place where the filaments contacted the cooling body was more than 35 cm., no latent crimp was produced and the cooling body served only to cool the filaments.

When air was additionally injected through the annular nozzle shown in FIG. 4 (annular slot 0.6 mm., amount of air about 7 m.³/h), the distance between the spinneret and the place where the filaments contacted the cooling body could be reduced to 9 cm. This arrangement likewise served to cool the filaments since only a feeble crimp was obtained after drawing.

EXAMPLE 2

In a manner analogous to that described in Example 1, a cooling body of the type shown in FIG. 4 and having a length of 29.5 cm. and a diameter of 11 cm. was used. The spun polyethylene terephthalate had a specific viscosity of 1.15. A 120-aperture nozzle (bore hole length 0.5 mm., bore hole diameter 0.5 mm.) of the type described in Example 1 was used. The spinning rate was 195 g./min. The cooling body was at a temperature of 13° C., the draw-off rate was 1400 m./min. No air was injected.

The distance between the spinneret and the place of contact between the filaments and the cooling body was 21 cm. The spinning chamber was open on all sides.

Below the cooling body the filaments had cooled down to such a degree that they could be collected. By drawing at room temperature at a ratio of about 1:3 and shrinking for some seconds at 160° C. in steam, a three-dimensional crimp was obtained. The following values were obtained:

$K_1 = 24\%$, $K_2 = 21\%$, $Re\ 87\%$

EXAMPLE 3

In a manner analogous to that described in Example 1, there was used a cooling body of the type shown in FIG. 4, having a length of 29.5 cm. and a diameter of 11 cm. but which was surrounded by a protective aluminum tube as shown in FIG. 5. The spun polyethylene terephthalate had a specific viscosity of 0.81. A 120-aperture nozzle (bore hole length 0.5 mm., bore hole diameter 0.5 mm.) of the type described in Example 1 was used. The spinning rate was 150 g./min., the temperature of the cooling body was 13° C. and the draw-off rate was 1500 m./min. No air was injected.

To obtain filaments having a three-dimensional helical crimp, the length L, D, B (see FIG. 5) had to be adjusted as indicated in the following Table 1.

TABLE 1

| L [mm.] | D [mm.] | B [mm.] |
|---|---|---|
| 300 | 200 | 280 |
| 200 | 200 | 250 |
| 100 | 200 | 180 |

To develop the crimp, the filaments were drawn and allowed to shrink as described in Examples 1 and 2.

EXAMPLE 4

The process was carried out under the same conditions as in Example 3 but while using, instead of the protective aluminum tube impermeable to air, a sieve tube permeable to air, having 68 meshes per cm². To obtain crimped filaments the following lengths had to be adjusted:

TABLE 2

| L [mm.] | D [mm.] | B [mm.] |
|---|---|---|
| 300 | 200 | 220 |
| 200 | 200 | 170 |
| 100 | 200 | 130 |

The crimp was developed by drawing and shrinkage as described in Examples 1 and 2.

EXAMPLE 5

A polyethylene terephthalate of a specific viscosity of 0.89 was spun from an annular 200-aperture nozzle with three circles of orifices (diameters 102.2 mm., 105.7 mm. and 109.2 mm., respectively, bore hole length 0.5 mm., bore hole diameter 0.5 mm.). A cooling body of the type shown in FIG. 4, having a length of 29.5 cm. and a diameter of 11 cm. was used. The temperature of the cooling body was 13° C. The draw-off rate was 1800 m./min. No air was injected. The distance of the spinneret from the place of contact between the filaments and the cooling body was 10 to 12 cm. The spinning chamber was open on all sides.

The filaments to which a latent crimp had thus been imparted were drawn in steam of about 100° C. at a ratio of about 1:3 and then allowed to shrink for some seconds in steam of about 160° C. to develop the crimp. The crimped filaments so obtained had the following crimp data:

$K_1\ 28.4\%$, $K_2\ 24\%$, $Re\ 85\%$, 10 bends/cm., tenacity 3.5 g./den.

EXAMPLE 6

A polyethylene terephthalate modified with 5% by weight, calculated on the total amount of diol, or dimethylpropanediol and having a specific viscosity of 0.87 was spun from an annular 120-aperture nozzle with two concentric circles of orifices (diameters 100 mm. and 110 mm., respectively, bore hole length 0.5 mm., bore hole diameter 0.5 mm.). The spinning rate was 195 g./min. The spinning temperature was 275° C. The cooling body was of the type shown in FIG. 4 and had a length of 29.5 cm. and a diameter of 11 cm. The temperature of the cooling body was 13° C. and the draw-off rate was 1500 m./min. No air was injected. The spinning chamber was open on all sides. The distance between the spinneret and the place of contact betwen the filaments and the cooling body was varied, that is it was adjusted to 13 cm., 17 cm. and 20 cm., respectively.

The filaments which had been passed over the cooling body were drawn at a ratio of 1:3 in steam of about 100° C. The crimp was developed in steam of 110° C. As determined by the number of bends per cm., the crimp decreased with increasing distance of the cooling body from the spinneret as shown in the following Table 3.

TABLE 3

| Distance of spinneret from place of contact between filaments and cooling body, mm. | Number of bends of crimp per cm. |
|---|---|
| 130 | 20 |
| 170 | 8 |
| 200 | 4 |

What is claimed is:

1. In the process of manufacturing filaments of synthetic linear high molecular weight polymers having a permanent three-dimensional crimp by rapidly cooling melt-spun filaments on one side thereof below the spinneret and developing the latent crimp by drawing and subsequent heating in the absence of tension, the improvement which comprises unilaterally cooling said melt-spun filaments by bringing said filaments in contact with the surface of a solid cooling body at a minimum draw-off rate of 500 meters per minute, said surface being maintained free of moisture and having a temperature within the range of from 0 to 70° C. and maintaining filament and surface contact over a minimum length, expressed in centimeters, and calculated according to the formula $$l_{min} = 3\sqrt{T} \cdot \frac{V}{1500}$$

in which T is the titer of said filaments in denier and V is the draw-off rate in meters per minute.

2. The improved process of claim 1 wherein said filaments are of a synthetic linear high molecular weight polyester.

3. The improved process of claim 1 wherein the surface of said body is maintained at a temperature of from 10 to 30° C.

4. The improved process of claim 1 wherein a stream of air or inert gas is blown onto the filaments at a point above the cooling body and at a minimum distance of 8 cm. below the spinneret.

5. The improved process of claim 4 wherein the surface of said body is maintained at a temperature of from 10 to 30° C.

References Cited

UNITED STATES PATENTS

| | | | |
|---|---|---|---|
| 2,324,397 | 7/1943 | Hull | 264—180 |
| 2,875,019 | 2/1959 | Spohn et al. | 264—168 |
| 3,084,386 | 4/1963 | Gerow | 264—95 X |
| 3,118,180 | 1/1964 | Nalle | 264—167 |
| 3,213,171 | 10/1965 | Kilian | 264—168 |
| 3,246,061 | 4/1966 | Blatz | 264—209 X |
| 3,366,722 | 1/1968 | Tessier | 264—168 |

FOREIGN PATENTS

| | | |
|---|---|---|
| 454,655 | 1950 | Italy. |
| 550,013 | 1955 | Italy. |
| 113,408 | 12/1966 | Netherlands. |
| 366,119 | 1963 | Switzerland. |
| 6501352 | 8/1955 | Netherlands. |

JULIUS FROME, Primary Examiner

J. H. WOO, Assistant Examiner

U.S. Cl. X.R.

18—8; 28—72; 269—168, 176